(12) United States Patent
Dragna

(10) Patent No.: US 8,318,012 B2
(45) Date of Patent: Nov. 27, 2012

(54) BARGE OIL SKIMMER

(75) Inventor: Lee Anthony Dragna, Morgan City, LA (US)

(73) Assignee: Gulp Oil Skimmers, L.L.C., Morgan City, LA (US)

( * ) Notice: Subject to any disclaimer, the term of this patent is extended or adjusted under 35 U.S.C. 154(b) by 288 days.

(21) Appl. No.: 12/900,059

(22) Filed: Oct. 7, 2010

(65) Prior Publication Data

US 2011/0315067 A1    Dec. 29, 2011

Related U.S. Application Data

(60) Provisional application No. 61/351,722, filed on Jun. 4, 2010.

(51) Int. Cl.
*E02B 15/04* (2006.01)
(52) U.S. Cl. ..................................... 210/242.3; 210/923
(58) Field of Classification Search ............. 210/170.09, 210/170.1, 170.11, 242.1, 242.3, 747.6, 776, 210/923
See application file for complete search history.

(56) References Cited

U.S. PATENT DOCUMENTS

| | | | | |
|---|---|---|---|---|
| 3,823,828 A | * | 7/1974 | Derzhavets et al. | 210/242.3 |
| 3,966,615 A | * | 6/1976 | Petchul et al. | 210/242.1 |
| 4,372,854 A | * | 2/1983 | Szereday | 210/242.3 |
| 4,588,501 A | * | 5/1986 | Jordan | 210/242.3 |
| 4,851,133 A | * | 7/1989 | Rymal | 210/923 |
| 5,409,607 A | * | 4/1995 | Karlberg | 210/242.3 |

* cited by examiner

*Primary Examiner* — Christopher Upton
(74) *Attorney, Agent, or Firm* — Roy Kiesel, Ford Doody & Thurmon, APLC

(57) ABSTRACT

An oil skimming water vessel having a hull and deck forming one or more interior compartments, wherein the hull comprising a bow or forward section, a mid-section, a stern or aft section, and an oil skimmer assembly, and wherein either or both of the bow or aft section constructed having a rake bottom shell. The oil skimmer assembly having first and second separated side walls (SKEG) extending vertically down from the rake bottom shell, a skimmer bottom plate extending between and affixed at the lower end sections of each of the side walls (SKEG) wherein the skimmer bottom plate having at least one discharge opening in its leading edge section, and a weir plate assembly. The rake bottom shell having at least one standpipe opening to which a standpipe attaches and extends vertically to a corresponding vessel deck opening. The weir plate assembly including a weir plate extending upward from the skimmer bottom plate between and affixed to the first and second side walls, the weir plate positioned between the discharge openings and the one or more standpipe openings. The weir plate with the side walls, the skimmer bottom plate, and the rake bottom shell forming an entrance to receive skimmed oil-containing water and a rear compartment positioned rearward of the weir plate to collect the skimmed oil-containing water passing over the top edge of the weir plate.

10 Claims, 4 Drawing Sheets

BARGE OIL SKIMMER

BACKGROUND OF THE INVENTION

1. Field of the Invention

This invention relates in general to apparatus for skimming oil from the surface of large bodies of water, more particularly to a reconfigured barge that is structured to skim oil from the surface of large bodies of water.

2. Prior Art

One long standing problem with the drilling and transporting of oil has been the spilling of oil into the waterways and water bodies in which the oil drilling and oil transporting take place. In response to this problem various devices, such as oil booms, oil skimmers and other oil collecting assemblies, have been attached to a variety of water craft from smaller boats, such as air boats and shrimp trawlers, to large ships, such as supertankers. However, the waterways and water bodies are not static, but are in constant motion due to weather or tide conditions. In deep, large bodies of waters, such as the oceans or large gulfs, there are likely two to three feet waves even on very calm days, and more likely larger waves up to six feet are common. For these reasons small water craft have been ineffective in collecting the oil in such bodies of water. Unfortunately, the oil collection process is made even more difficult by the fact that the oil slick is also moving both on the water surface, as well as, vertically in the water. This movement is not necessarily coordinated with the movement of the wave action of the water which can result in the oil slicks making sudden turns or movements. Most large vessels are not sufficiently maneuverable to track the movement of these oil slicks, and therefore are inefficient in collecting the oil in the rougher, larger bodies of water. If there are large quantities of oil to be collected it is highly desirable that the water vessels be designed to collect large quantities of oil over a relatively short time period to prevent the oil from spreading and reaching the shorelines where recovery may be even more difficult and increased damage to the environment can occur. Despite this decades old problem and the large sums of money and manpower spent there still exists a need for a water vessel having the combined ability to operate in rough seas with the necessary maneuverability to track the oil at speeds that permit the collection of large quantities of oil over a relatively short period of time. Such a vessel would be very desirable to the oil and gas drilling and transporting industry.

OBJECTS AND SUMMARY OF THE INVENTION

Therefore, one object of this invention is to provide a water vessel having the combined ability to operate in rough seas with the necessary maneuverability to track the oil at speeds that permitted the collection of large quantities of oil over a relatively short period of time.

Other objects and advantages of this invention shall become apparent from the ensuing descriptions of the invention.

Accordingly, one embodiment this invention comprises an oil skimmer assembly constructed having separated side walls attachable to a bow or stern section rake wall of a barge or similar water vessel, a skimmer bottom plate extending between the separated side walls, and a weir plate assembly including a weir plate extending upward from the skimmer bottom plate. In one preferred embodiment, the separated side walls extend downward from the rake wall of either the bow or stern section preferably to a depth approximating the depth of the barge bottom. In this embodiment the skimmer bottom plate is preferably affixed to each of the separated side walls so that it is also at a depth approximating the depth of the barge bottom. In a more preferred embodiment the skimmer bottom plate has one or more openings positioned between the leading edge of the skimmer bottom plate and the weir plate to permit the lower layer of the oil and water mixture entering the oil skimmer assembly to flow out of the oil skimmer assembly before it can pass over the weir plate. In another preferred embodiment the weir plate will extend upward to a height above the barge draft line. The rake wall section, the separated side walls, the skimmer bottom plate, and the weir plate are assembled to form a skimming entrance which during operation receives the oil and water mixture from the surface layer of the body of water and a rearward positioned compartment for capturing the oil and water mixture that flows over the top of the weir plate. In another preferred embodiment a standpipe extends from the barge deck to the barge wall section whereby it opens up into the rear compartment to permit a suction hose to extend from the barge deck into the rear compartment to siphon off the collected oil and water mixture.

In another embodiment of the invention, a barge having the oil skimmer assembly operatively attached to either its bow section rake wall or its stern section rake wall is constructed having at least one, but preferably two or three separate elongated compartments or holds within the hull, preferably running parallel to the sides of the barge. This embodiment further includes a combination of hoses, pumps and valves operatively connected to siphon the oil and water mixture from the oil skimmer assembly compartment to a first of the barge compartments, then to the second barge compartment, then to the third barge compartment, and then uploaded to an oil storage tank or oil transport vessel.

BRIEF DESCRIPTION OF THE DRAWINGS

The accompanying drawings illustrate a preferred embodiment of this invention.

PREFERRED EMBODIMENTS OF THE INVENTION

Without any intent to limit the scope of this invention, reference is made to the figures in describing the preferred embodiments of the invention. Although there are different kinds of water vessels that can be utilized, the preferred embodiments of the invention are illustrated utilizing a modified conventional barge.

Figure 1:
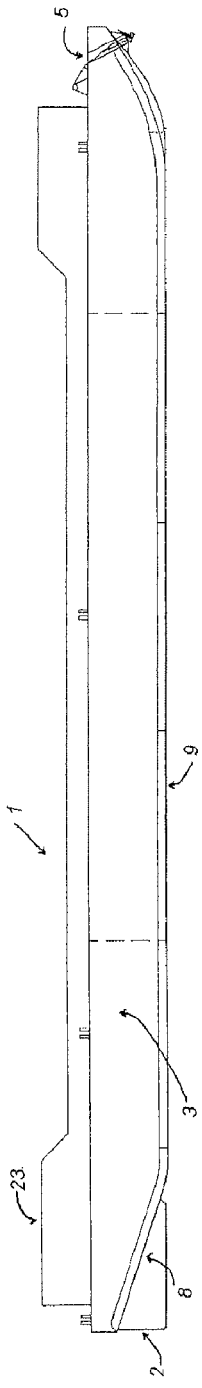
FIG. 1 is a profile view of a preferred embodiment of the modified oil skimmer barge of this invention.
Figure 2:
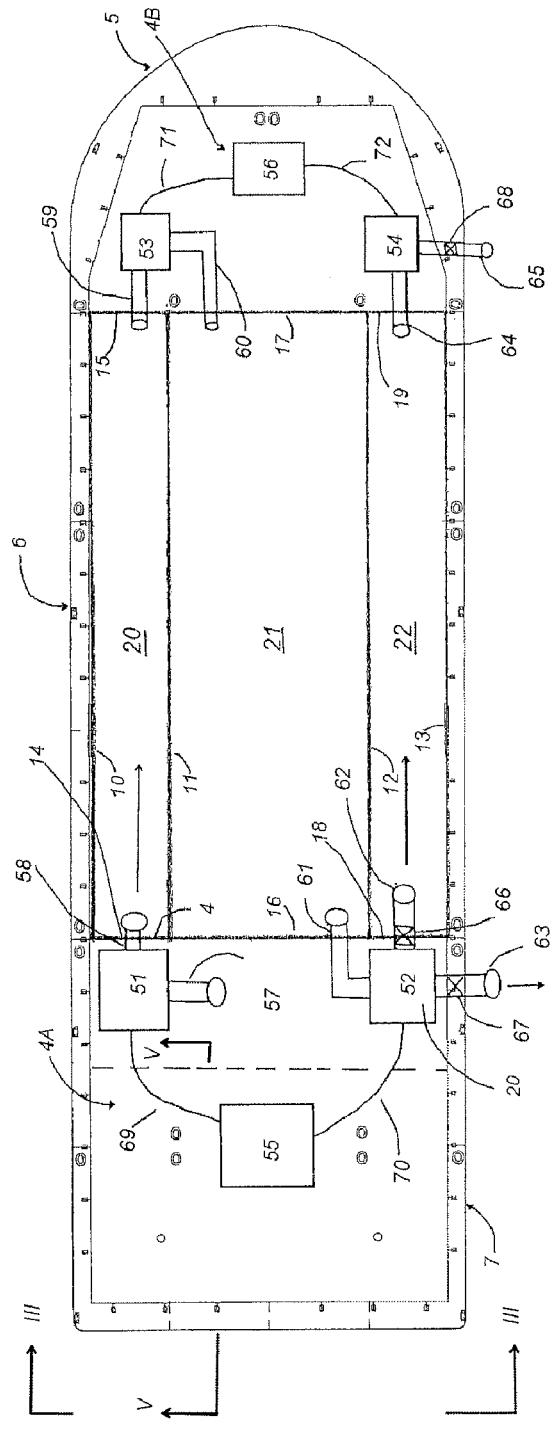
FIG. 2 is a plan view of the modified oil skimmer barge illustrated in FIG. 1.

FIGS. 1 and 2 illustrate a conventional barge 1 that has been modified to add the oil skimmer assembly 2 of this invention. Although barges can vary in dimensions this invention is applicable to all sizes. A smaller barge may typically be 54 feet wide by 180 feet long. Larger barges may typically be 100 feet wide by 330 feet long. Barge 1 is shown scaled to be 90 feet wide and 300 feet long. The barge 1 comprises a hull structure 3 and a deck structure 4. The hull and deck structures 3, 4 form a barge having a bow or forward section 5, a mid-section 6 and a stern or aft section 7. Typically, either or both the bow section 5 or the stern section 6 will be constructed having a rake wall surface 8. In FIGS. 1 & 2 only the stern section 6 is illustrated have flat rake wall surface 8 that extends between the sides of the barge 1. It is to surface 8 that the oil skimmer assembly 2 is attached. It is to be understood that if the bow section 5 had a similar rake wall surface, the oil skimmer assembly 2 could be attached to the bow section rake wall surface. The hull structure 3 will also include a keel or bottom section 9. The barge 1 will also include a series of steel or other metal walls 10-19 affixed to the hull structure 3 and deck structure 4 that form separated compartments 20-22 that can be used to contain the oil and water mixture that has been collected by the oil skimmer assembly 2. The deck area above compartments 20-22 can be open to permit visual inspection of the oil-water mixture level in each compartment 20-22 and to determine the degree of oil separation from the water.

The barge 1 may also include a superstructure 23 on top of the deck structure 4 that can serve as a control room for operating the equipment that may be used on the barge 1, or if the barge 1 is self-propelled as the bridge. Typically, the barge 1 would be navigated by a tug (not shown) pushing against the barge stern section 7. However, in this invention the oil skimmer assembly 2 is affixed to and becomes part of the barge stern section 7. Therefore, the barge is navigated by a tug pushing against the barge bow section 5 or by being lashed to barge 1 by ropes or other conventional means to be positioned at the mid-section 6 of the barge 1 along one side of the hull structure 3. In another embodiment the barge 1 may include its own propulsion system that permits it to navigate without the use of a tug.

Figure 3:
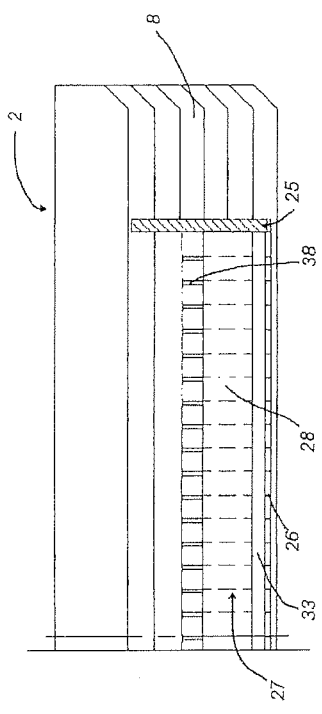
FIG. 3 is a partial stern view depicting the oil skimmer modification including the weir plate, the filler plate and the SKEG of the oil skimmer barge taken along lines of FIG. 2.
Figure 4:
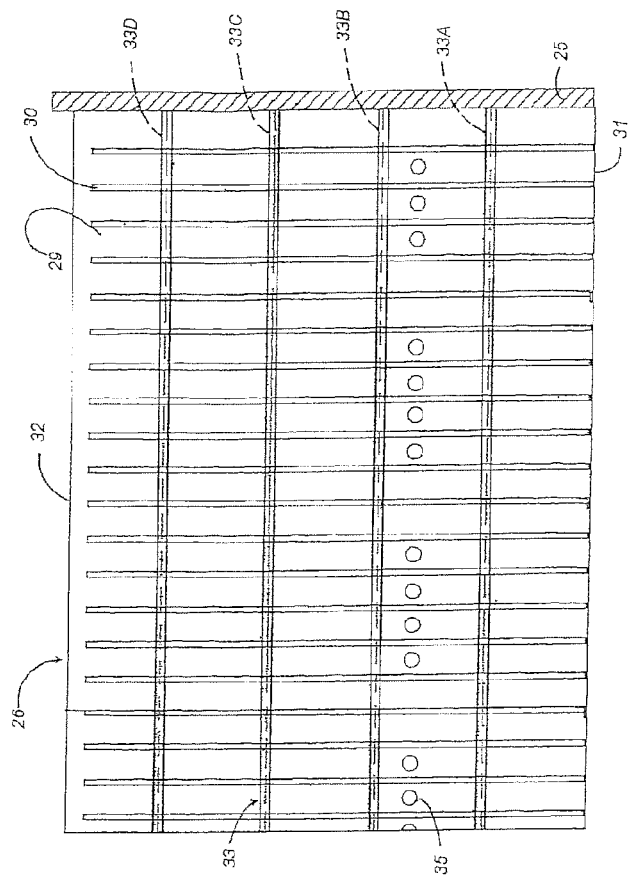
FIG. 4 is a top view taken along lines IV-IV illustrating the features of the skimmer bottom plate.

FIG. 3 illustrates a frontal view of a preferred embodiment of the oil skimmer assembly 2 affixed to rake wall surface 8. Oil skimmer assembly 2 includes a pair of separated vertically oriented side walls 24, 25, a skimmer bottom plate 26 and a weir assembly 27 including a weir plate 28. FIG. 4 illustrates a preferred embodiment of the skimmer bottom plate 26, as viewed from its underneath side 29, having a series of latitudinal stiffeners 30 affixed to the underneath side 29 and running from the bottom plate leading edge 31 that receives the oil and water mixture (as indicated by the →) and toward the bottom plate rearward edge 32. In addition, there is a second series of longitudinal stiffeners 33 of reinforcing metal I-beams or other shaped longitudinal stiffeners 33A-33D affixed to the upper side 34 of skimmer bottom plate 26 and running between the side plates 24, 25. FIG. 4 also illustrates one embodiment of a novel feature of the oil skimmer assembly 2. Skimmer bottom plate 26 is provided with at least one, and more preferably, with a series of openings 35 positioned between the latitudinal stiffeners 30 and the longitudinal stiffeners 33 and between skimmer bottom plate leading edge 31 and the attachment position 36 that weir plate 28 extends upward from the longitudinal stiffener 33B. It has been unexpectedly found that barge 1 can be operated at greater speed, handle the large volume of water entering the oil skimmer assembly entrance 37, and more efficiently capture that portion of the entering water that contain the desired oil if skimmer bottom plate 26 is further provided with a series of separated openings 35. The number and size of the openings 35 depends on barge size, sea conditions and the volume of water that enters the oil skimmer assembly entrance 37. Although openings 35 can assume different shapes and sizes, it is preferred that openings 35 be uniformly spaced across skimmer bottom plate 26 and each opening 35 be 1-3 feet in diameter, more preferably about 2 feet in diameter.

Figure 6:
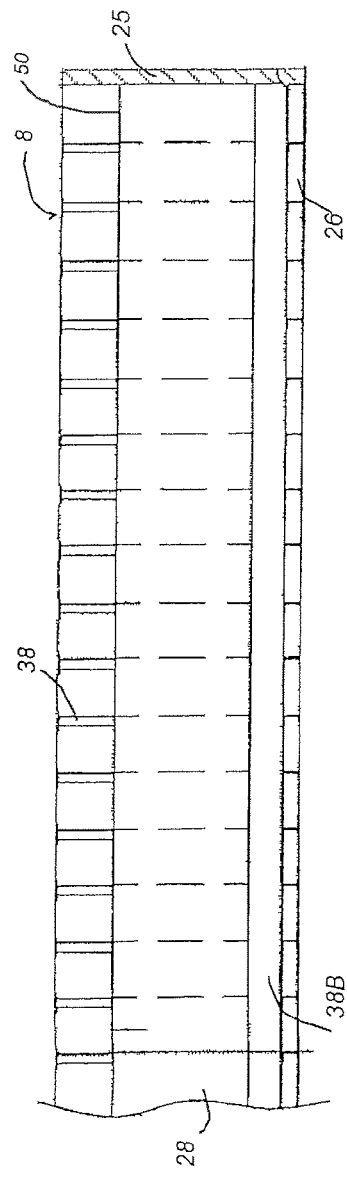
FIG. 6 is a section view taken along lines VI-VI in FIG. 5 illustrating a front view of the weir plate assembly including the weir plate, the filler plate and vertical support beams.
Figure 7:
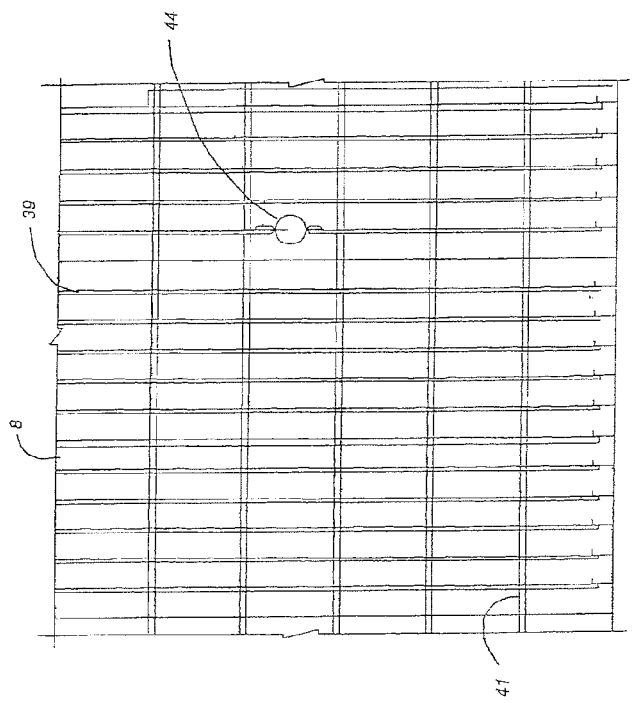
FIG. 7 is an orthogonal plan view of the rake or inclined bottom of the stern section of the oil skimmer barge taken along lines VII-VII of FIG. 5.
Figure 5:
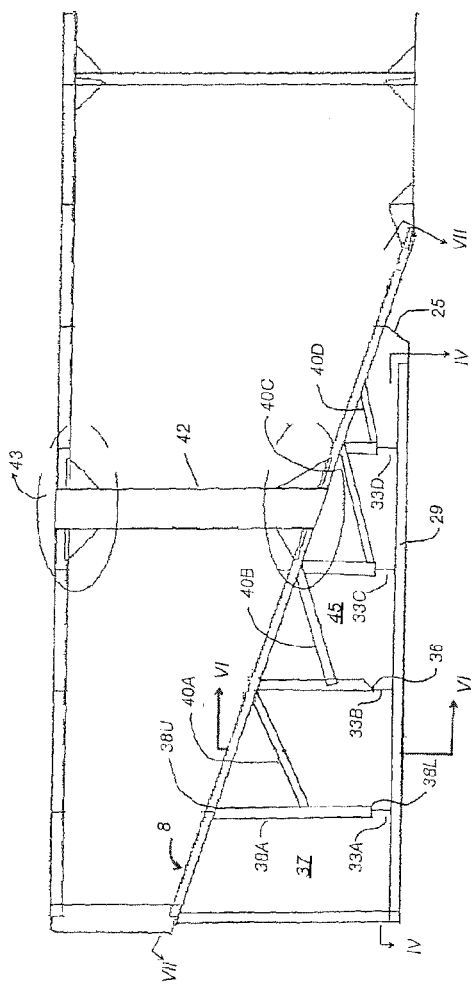
FIG. 5 is an elevation view taken along lines V-V of FIG. 2 illustrating the positioning of the weir plate and standpipe in relationship to the skimmer bottom plate.

During the oil skimming operation, oil skimmer assembly 2 is subjected to extreme forces caused by the forward movement of barge 1 forcing large volumes of water into the oil skimmer assembly 2 and by the body of water striking the oil skimmer assembly 2 as the barge moves up and down as the result of the wave action. It is therefore, preferable that oil skimmer assembly 2 be provided with additional structural bracing such as illustrated in FIGS. 5-7. These would include the series of rows of vertical steel I-beams 38 extending upward from and attached at their lower end 38L to the longitudinal stiffeners 33 and at their upper end 38U to longitudinal stiffeners 39 affixed to bottom rake surface 8. In addition, beams 38 are further strengthened by cross-bracing members 40. Bottom rake surface 8 is also provided with latitudinal beams 41.

Figure 9:
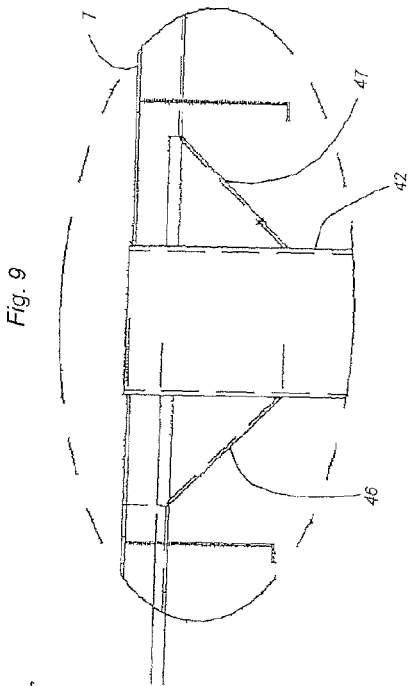
FIG. 9 is a detail view in FIG. 5 illustrating the attachment of the standpipe to the rake or inclined stern wall.
Figure 8:
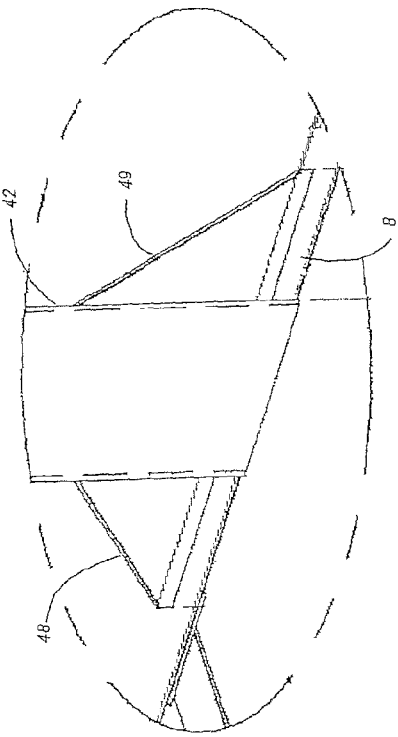
FIG. 8 is a detail view in FIG. 5 illustrating the attachment of the standpipe to the deck of the barge in FIG. 2.

As shown in FIGS. 5 and 8-9, standpipe 42 extends from deck opening 43 through bottom rake surface opening 44. Standpipe 42 is of sufficient diameter to permit a hose to extend through to assist in the removal of the oil and water mixture that passes over weir plate 28 and captured in skimmer compartment 45 formed by weir plate 28, skimmer bottom plate 29, and bottom rake side 8. If desired, one than one standpipe 42 can be installed to permit more than one hose to be inserted into oil skimmer assembly compartment 45. Standpipe 42 is supported in place by upper brackets 46, 47 and lower brackets 48, 49.

In a preferred embodiment as seen in FIG. 2, deck structure 4 will have a stern section 4A and a bow section 4B on which the various pumps 51-54, generators 55-56, hoses 56-65, valves 66-68, connecting electrical wires 69-72, and other equipment can be operatively positioned.

In operation, a tug boat is connected to one side of barge 1 in any conventional manner that permits the tug boat to drive the barge stern 7 forward toward the oil slick that is to be skimmed. As the stern 7 enters the oil slick the oil-water mixture on the water surface, as well as the substantially water only layer below the oil-water mixture is funneled into the oil skimmer apparatus entrance 38. With the continued forward movement of barge 1 the oil and water mixture is forced against weir plate 28, and its level is caused to rise as additional oil and water enters entrance 38 until it flows over the top edge 50 of weir plate 28. The selection of number and size of drain openings 35 and the selection of the barge speed forces the bottom portion of the mixture and water to exit through drain openings 35. Since the bottom portion is substantially only water, there exists a greater oil-to-water ratio in the oil-water mixture flowing over weir plate top edge 50. Thus, there is a significantly greater percentage of oil to water captured in a shorter period of time than had heretofore been possible with other deep water oil skimmer assemblies. In turn this allows much larger quantities of oil to be separated from the water without having to shut down the skimming operation of the barge 1 as had been required by other prior art techniques.

As the oil skimmer assembly compartment 45 fills with the oil-water mixture, intake hose 57 is inserted through deck opening 43 and into standpipe 42 until it extends into oil skimmer assembly compartment 45. Generator 55 is started to apply power through line 69 to pump 51 that then pumps out the captured oil-water mixture in compartment 45. The oil-water mixture enters the intake section of pump 51 and is then discharged from pump 51 from its discharge section through discharge hose 58 into holding tank 20. Because the volume of holding tank 20 is significantly larger than that of oil skimmer assembly compartment 45, the further separation of the oil and water takes place as holding tank 20 fills up. When holding tank 20 reaches a predetermined level the separating oil and water mixture is pumped to holding tank 21 by use of intake hose 59, pump 53 powered by generator 56, and discharge hose 60. Once holding tank 21 reaches its predetermined level the further separated oil and water mixture is pumped to holding tank 22 by use of intake hose 61, pump 52 also powered by generator 55 and discharge hose 62. By setting the level of fluid in each holding tank 20, 21 and 22 allows the operator to maintain barge 1 level and continue efficient skimming operations. If the oil and water have sufficiently separated in holding tank 21, intake hose 61 is inserted until its intake end is near the bottom of holding tank 21 so as to first remove the denser water. By closing valve 66 and opening valve 67, this water can be discharged through hose 63 back into the water body. The remaining concentrated oil mixture can be pumped into holding tank 22 by reversing the valve settings. Finally, the concentrated oil mixture in holding tank 22 is removed by inserting hose 64 near the top of the liquid level in holding tank 22 to remove the concentrated oil mixture by opening valve 68 and activating pump 54 to discharge it to an oil tanker other larger vessel that can transport it to storage tanks located on shore. Alternatively, hose 64 can be positioned near the bottom of the holding tank 22 to first remove the remaining water by pumping it back into the water body. Once the water is removed pump 54 is shut down and the remaining 95+% oil mixture is captured in holding tank 21 where it can be off-loaded to a tanker. It is preferred that once holding tank 21 has reached the desired level, that the skimming operation be stopped for a short period of time, preferably 30-60 minutes, to permit further separation of the oil and water. Such procedure has achieved a 99% separation of the oil and water on barge 1. This separation is significantly greater than any other known deep water skimming vessel that is designed to capture the same quantities of oil-water mixture.

There are many various configurations of pumps and hoses that could be used to move the oil and water mixture form one hold to another hold. This would include the use of a single pump to perform more than one segment of the transfer of the oil and water mixture between the holds. In whatever configuration used, it is desirable that a minimum amount of turbulence in the oil and water mixture be created during the transfer from one hold to the next hold. It is also desirable that the size, shape and number holds be such to achieve the desired separation of oil and water in the last hold in order to ensure only a minimum amount of the oil that may been captured is returned to the water body. In another embodiment the pumps could be hydraulically driven.

What I claim is:

1. An oil skimmer assembly for collecting an oil and water mixture found in the surface layer of a body of water and for use with a water vessel having a hull and deck forming a bow section, a mid-section and a stern section, at least one of the bow section or the stern section having an rake exterior wall surface, comprising:
    a pair of separated side walls, each side wall having one vertical edge forming an angle compatible for affixing to the rake exterior wall surface, each side wall having an upper edge section and a lower edge section;
    a skimmer bottom plate extending between and affixed to the pair of separated side walls at their lower edge sections, the skimmer bottom plate having a leading edge and a rearward edge for affixing to the rake exterior wall surface, and at least one opening positioned between the leading edge and the rearward edge;
    a weir assembly comprising a weir plate affixed to and extending upward from the skimmer bottom plate at a position between the at least one opening and the rearward edge, the weir plate having a top edge;
    wherein the side walls, the skimmer bottom plate and the weir assembly when affixed to the rake exterior wall surface form a skimming entrance into which the oil and water mixture can enter and form an oil and water mixture collecting compartment to receive the oil and water mixture that passes over the weir plate top edge.

2. An oil skimmer assembly according to claim 1 wherein:
    the exterior rake wall surface having an upper edge section and a lower edge section,
    each side wall is structured to permit its lower edge section to be affixed to the exterior rake wall surface lower edge section and to permit its upper edge section to extend above the surface layer of the body of water, and
    the skimmer bottom plate is affixed to the side walls at about the same depth that the side walls are affixed to the exterior rake wall surface lower edge section.

3. An oil skimmer assembly according to claim 1 wherein the at least one opening has an area to prevent at least a portion of the lower layer of the oil and water mixture from passing over the weir plate and into the collection compartment.

4. The oil skimmer assembly according to claim 3 wherein the skimmer bottom plate further comprises a series of separated ribs extending from the rearward section of the skimmer bottom plate toward the leading edge section of the skimmer bottom plate, and one or more cutout openings in the bottom plate positioned between the series of separated ribs.

5. An oil skimmer assembly according to claim 1 wherein the weir plate having and upper edge and a height wherein the upper edge extending above the body of water surface layer and below the exterior rake wall surface.

6. An oil skimming water vessel having a hull and deck forming a bow section, a mid-section and a stern section, the mid-section having at least one interior compartment for receiving an oil and water mixture, at least one of the bow section or the stern section having an exterior rake wall surface, the improvement to which comprises affixing an oil skimmer assembly to the exterior rake wall surface, wherein the oil skimmer assembly comprises:
    a pair of separated side walls, each side wall having one vertical edge forming an angle compatible for affixing to the rake exterior wall surface, each side wall having an upper edge section and a lower edge section;
    a skimmer bottom plate extending between and affixed to the pair of separated side walls at their lower edge sections, the skimmer bottom plate having a leading edge and a rearward edge for affixing to the rake exterior wall surface, and at least one opening positioned between the leading edge and the rearward edge;
    a weir assembly comprising a weir plate affixed to and extending upward from the skimmer bottom plate at a position between the at least one opening and the rearward edge, the weir plate having a top edge;
    wherein the side walls, the skimmer bottom plate and the weir assembly when affixed to the rake exterior wall surface form a skimming entrance into which the oil and water mixture can enter and form an oil and water mixture collecting compartment to receive the oil and water mixture that passes over the weir plate top edge.

7. An oil skimming water vessel according to claim 6 wherein the mid-section having at least two interior compartments for receiving an oil and water mixture from the oil skimmer assembly collecting compartment, further comprising:

at least one standpipe operatively extending from the deck to the exterior rake wall surface at a position leading into the oil skimmer assembly collecting compartment;

a first pump positioned on the deck and having an intake opening and a discharge opening, a first hose operatively attached to the intake opening and sized to extend through the at least one standpipe and into the oil skimmer assembly collecting compartment to draw the oil and water mixture from the collecting compartment and to the pump, a second hose operatively attached to the discharge opening to receive the oil and water mixture from the pump and to deliver the oil and water mixture to at least one of the at least two interior compartments; and a second pump positioned on the deck and having an intake opening and a discharge opening, a second pump first hose operatively attached to the second pump intake opening and sized to extend into at least one of the at least two interior compartments to draw the oil and water mixture from the at least one of the at least two interior compartments and to the second pump, a second hose operatively attached to the second pump discharge opening to receive the oil and water mixture from the pump and to deliver the oil and water mixture to another of the at least two interior compartments.

8. An oil skimming water vessel according to claim 7 further comprising means for drawing the oil and water mixture from the another of the at least two interior compartments and to deliver the oil and water mixture to a designated location.

9. An oil skimming water vessel according to claim 8 wherein the means comprises the second pump, a directional flow control valve operatively attached to the second pump discharge opening wherein the second pump second hose and a second pump third hose are operatively attached to the directional flow control valve to receive the oil and water mixture flowing through the directional flow control valve when the directional flow control valve is directed to direct the oil and water mixture to either the second pump second hose or the second pump third hose.

10. An oil skimming water vessel according to claim 8 wherein the means comprises a third pump positioned on the deck and having a third pump intake opening and a third pump discharge opening, a third pump first hose operatively attached to the third pump intake opening and sized to extend into the another of the at least two interior compartments, a third pump second hose operatively attached to the third pump discharge opening to receive the oil and water mixture from the third pump and to deliver the oil and water mixture to the designated location.

* * * * *